United States Patent
Tian et al.

(10) Patent No.: US 10,033,186 B2
(45) Date of Patent: Jul. 24, 2018

(54) UNIFIED POWER FLOW CONTROLLER FOR DOUBLE-CIRCUIT LINE

(71) Applicants: NR ELECTRIC CO., LTD., Nanjing, Jiangsu (CN); NR ELECTRIC ENGINEERING CO., LTD., Nanjing, Jiangsu (CN)

(72) Inventors: Jie Tian, Jiangsu (CN); Haiying Li, Jiangsu (CN); Xinbao Wang, Jiangsu (CN); Yunlong Dong, Jiangsu (CN); Quanrong Shen, Jiangsu (CN); Lei Pan, Jiangsu (CN); Chao Liu, Jiangsu (CN); Baoli Chang, Jiangsu (CN)

(73) Assignees: NR Electric Co., Ltd., Nanjing, Jiangsu (CN); NR Electric Engineering Co., Ltd., Nanjing, Jiangsu (CN)

( * ) Notice: Subject to any disclaimer, the term of this patent is extended or adjusted under 35 U.S.C. 154(b) by 136 days.

(21) Appl. No.: 15/311,540

(22) PCT Filed: Jan. 12, 2015

(86) PCT No.: PCT/CN2015/070491
§ 371 (c)(1),
(2) Date: Nov. 16, 2016

(87) PCT Pub. No.: WO2015/176546
PCT Pub. Date: Nov. 26, 2015

(65) Prior Publication Data
US 2017/0098936 A1 Apr. 6, 2017

(30) Foreign Application Priority Data

May 19, 2014 (CN) .......................... 2014 1 0212139

(51) Int. Cl.
H02J 3/46 (2006.01)
H02J 3/14 (2006.01)
H02J 3/16 (2006.01)

(52) U.S. Cl.
CPC ................. *H02J 3/14* (2013.01); *H02J 3/16* (2013.01); *H02J 3/46* (2013.01)

(58) Field of Classification Search
CPC ................... H02J 3/14; H02J 3/16; H02J 3/46
See application file for complete search history.

(56) References Cited

U.S. PATENT DOCUMENTS

2006/0071554 A1* 4/2006 McNamara ............. H02J 3/005
307/10.1
2012/0044722 A1* 2/2012 Cuk ...................... H02M 3/335
363/21.03
(Continued)

FOREIGN PATENT DOCUMENTS

CN 102983577 3/2013
CN 103414185 11/2013
(Continued)

OTHER PUBLICATIONS

International Search Report of PCT/CN2015/070491 dated Apr. 13, 2015, 6 pages (English and Chinese).

*Primary Examiner* — Thienvu Tran
*Assistant Examiner* — Pinping Sun
(74) *Attorney, Agent, or Firm* — Rankin, Hill & Clark LLP

(57) ABSTRACT

A unified power flow controller for a double-circuit transmission line comprises at least one parallel-connection transformer, three current converters, at least two series-connection transformers, a parallel-connection side switching circuit, a series-connection side switching circuit and a direct current common bus. The series-connection transformers connected with at least one group of by-pass (Continued)

switches in parallel. The three current converters connected to each loop line in series after being connected with at least one series-connection transformer through the series-connection side switching circuit. The three current converters connected to an alternating current system after connected with at least one parallel-connection transformer through a parallel-connection side switching circuit starting circuit. The three current converters are connected to the direct current common bus through a transfer switch.

15 Claims, 4 Drawing Sheets

(56) References Cited

U.S. PATENT DOCUMENTS

| | | | | | |
|---|---|---|---|---|---|
| 2012/0283890 | A1* | 11/2012 | Fu | ............................ | H02J 3/14 |
| | | | | | 700/295 |
| 2014/0265560 | A1* | 9/2014 | Leehey | .................. | B60L 1/003 |
| | | | | | 307/10.1 |
| 2015/0042176 | A1* | 2/2015 | Fu | ............................ | H02G 7/16 |
| | | | | | 307/113 |
| 2015/0162782 | A1* | 6/2015 | Kanakasabai | ........... | H02J 9/062 |
| | | | | | 307/23 |
| 2016/0013653 | A1* | 1/2016 | Dorn | ..................... | H02M 7/003 |
| | | | | | 363/35 |

FOREIGN PATENT DOCUMENTS

| | | | | | |
|---|---|---|---|---|---|
| CN | 103414185 A | * | 11/2013 | ................ | H02J 3/00 |
| CN | 103972887 | | 8/2014 | | |
| CN | 104092234 | | 10/2014 | | |
| CN | 104113070 | | 10/2014 | | |
| CN | 104124682 | | 10/2014 | | |
| CN | 104124694 | | 10/2014 | | |

* cited by examiner

UNIFIED POWER FLOW CONTROLLER FOR DOUBLE-CIRCUIT LINE

FIELD OF THE INVENTION

The present invention relates to a flexible alternating current power transmission technology, in particular to a unified power flow controller for a double-circuit line.

BACKGROUND

Along with interconnection of large-sized power systems and various new devices, the scale and complexity of the power system are increased while power generation and power transmission are more economic and efficient; in addition, since massive distributed power generation systems are connected to a power grid, the traditional fixed power flow transmitted to a power distribution network from a power transmission network is reversed; the continuous increase of user loads needs a power flow control means to improve the existing power transmission capacity; and the power exchange between the flourish smart power grid and the power market needs frequent power flow control.

A unified power flow controller (UPFC) is the power flow control device having the best universality so far, the simplest UPFC consists of two exactly same voltage source converters connected by a common direct end, and can be regarded as a constitution of a static synchronous compensator (STATCOM) and a static synchronous series-connection compensator (SSSC), by only changing a control rule, different control functions of parallel compensation, serial compensation, phase shift, etc., can be fast realized in the meantime or respectively, and the performances of the power systems are improved.

At present, more research on the UPFC is a topological structure and control strategy directed to a mono-circuit power transmission line UPFC, and the research on the UPFC for the double-circuit transmission line is less. Since the power transmission networks in China are mostly double-circuit or multi-circuit line, the power flow optimization problem and N-1 overcurrent problem occur in the multi-circuit line, and if only one circuit of the multi-circuit line is provided with the UPFC to control the power flow of the line, a control effect is poor. Therefore, if an optimal addressing location of the UPFC is a double-circuit line, the UPFC needs to be mounted on both double circuits. If a set of whole UPFC is mounted on each circuit of the double-circuit line, each UPFC consists of a static synchronous compensator (comprising a parallel-connection transformer and a parallel-connection side converter) and a static synchronous series-connection compensator (comprising a series-connection transformer and a series-connection side converter) which are connected, and four converters and four transformers are required in total, the occupied space is larger and the investment cost is higher; and when any converter is failed, the power flow control over the double-circuit power transmission line is not realized.

In order to solve the deficiency of the UPFC applied to the double-circuit line, save investment cost and a mounting space, improve the efficiency and reliability of the UPFC, and fully play the advantage of the UPFC, there is a need of a more economic and more flexible structure.

BRIEF DESCRIPTION

An objective of the present invention is to provide a UPFC suitable for a double-circuit power transmission line, this topological structure can realize various operation modes, when one current converter is in fault, power flow control of the double-circuit transmission line can still be achieved, one parallel-connection side converter can be saved, and the UUPFC is excellent in economy, flexibility and reliability.

In order to realize the objective, a solution to the present invention is:

A UPFC for a double-circuit transmission line, characterized in that:

The UPFC applied to a double-circuit transmission line comprises at least one parallel-connection transformer, three current converters, at least two series-connection transformers, a parallel-connection side switching circuit, a series-connection side switching circuit and a direct current common bus; the at least one side of the series-connection transformers is connected with at least one group of by-pass switches in parallel; the alternating current sides of the three current converters are connected to each loop line in series after being connected with at least one series-connection transformer through the series-connection side switching circuit; the alternating current sides of the three current converters are connected to an alternating current system after connected with at least one parallel-connection transformer through a parallel-connection side switching circuit starting circuit; and the direct current sides of the three current converters are connected to the direct current common bus through a transfer switch.

Further, the parallel-connection side switching circuit consists of at least one change-over switch, and is configured to connect or disconnect the three converters to or from the parallel-side alternating current system in different combination forms; and the series-connection side switching circuit consists of at least one change-over switch, and is configured to connect or disconnect the three converters to or from the series-side transformer in different combination forms.

Further, the UPFC also comprises at least one parallel side starting circuit, correspondingly, the at least three converters are connected to the at least one parallel-connection side starting circuit by the parallel-connection side switching circuit and are then connected to at least one parallel-connection transformer.

Further, the by-pass switches are by-pass circuit breakers or fast by-pass switches.

Further, the at least one group of by-pass circuit breakers is connected to two ends at a line side winding of the series-connection transformer in parallel and is configured to control the series-connection transformer to connect to or disconnect from the line.

Further, the at least one group of fast by-pass switches is connected between phases of a valve side of the series-connection transformer in parallel and is configured to fast bypass and isolate the converters from the line.

Further, the UPFC realizes various operation modes, including but limited to: a double-circuit line UPFC operation mode, a mono-circuit line UPFC operation mode, a static synchronous compensator UPFC operation mode, a static synchronous series-connection compensation UPFC operation mode and an inter-line UPFC operation mode by the switching operation of the parallel-connection side switching circuit and the series-connection side switching circuit.

Further, the change-over switches are isolated switches, or circuit breakers, or switches consisting of power electronic devices.

Further, the alternating current system to which the parallel-connection transformer is connected is a common bus of the double-circuit power transmission line, or other alternating current buses.

Further, the parallel-connection side starting circuit comprises a pair of resistor and switch connected in parallel, the switch is an isolated switch, circuit breaker, or switch consisting of a power electronic device.

Further, the fast by-pass switches are circuit breakers, two-way antiparallel thyristors or other power electronic devices.

Further, the converters are voltage source type converters, including but not limited to a two-level structure, a transformer multi-structure or modular multi-level structure.

Further, the series-connection transformer is a mono-phase or tri-phase transformer, and the line side winding of the series-connection transformer is serially connected to the line phase by phase.

Further, when the UPFC controls an N-circuit line, the number of the converters is at least N+1, the number of the series-connection transformers is at least N and N is a natural number larger than 2.

After the solution is adopted, the present invention can improve the flexibility, economy and reliability of the UPFC applied to the double-circuit line. During normal operation, one converter is connected to a parallel system, and performs fast reactive compensation with an alternating current system or controls the parallel-connection side bus, the other two converters are connected to the series-connection transformer and control the power flow of the double-circuit line. When one converter is failed, the rest two converters can become to SSSC or inter-line power flow control IPFC for operation by a switching operation, and the power flow of the double-circuit line can still be controlled. In addition, all the three converters can serve as the STATCOM for operation, and improve the reactive storage of the system. Since only three converters are adopted, one converter is saved compared with the mode that one group of whole UPFC is mounted on either circuit of the double-circuit line, good economy is realized, greater stability with respect to an alternating current voltage is realized without the need of an alternating current bus voltage-controlled system and the economic effect is obvious. For the UPFC applied to the N-circuit line, a similar structure can be adopted, at least N+1 converters are required and its economic benefit is more obvious.

DETAILED DESCRIPTION

Embodiments of the present invention are explained in detail in combination with the drawings.

Figure 1:
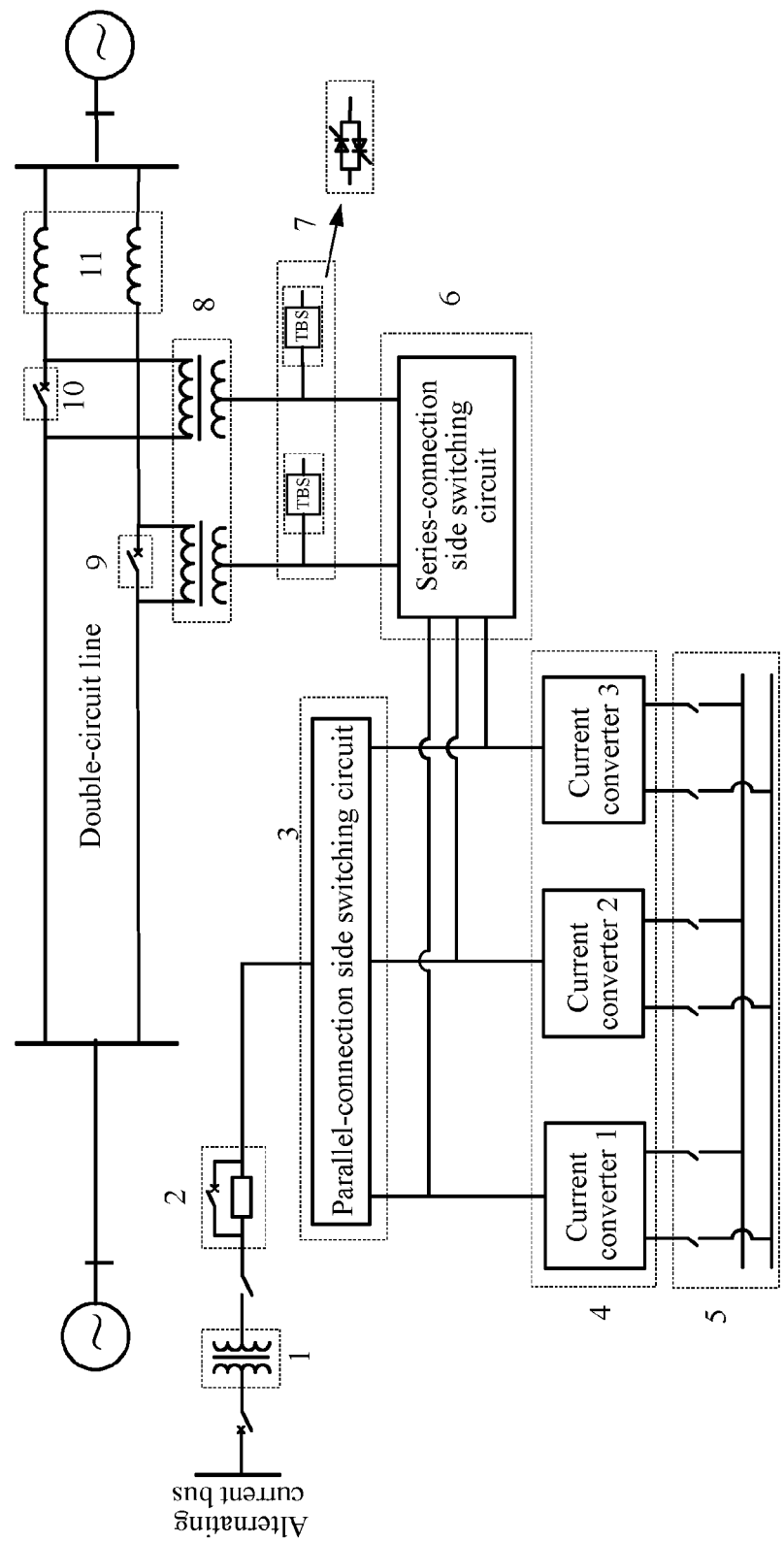
FIG. 1 is a mono-phase equivalent structural diagram of a UPFC of one embodiment of the present invention.

The present invention provides a UPFC suitable for a double-circuit transmission line, and one of its preferable embodiments is as shown in FIG. 1, in which, 1 is a parallel-connection transformer, 2 is a parallel-connection side starting circuit, 3 is a parallel-connection switching circuit, 4 is a voltage source converter, 5 is a direct current bus and a change-over switch, 6 is a series-connection switching circuit, 7 is a parallel-connection fast by-pass switch of a valve side winding of the series-connection transformer, 8 is a series-connection transformer, 9 and 10 are parallel-connection by-pass circuit breakers of a line side winding of the series-connection transformer and 11 is a reactance of a double-circuit line value.

The UPFC comprises at least one parallel-connection transformer 1, a starting circuit 2, three current converters 4, at least two series-connection transformers 8, a parallel-connection side switching circuit 3, a series-connection side switching circuit 6 and a direct current common bus 5. At least one side of the series-connection transformers is connected with at least one group of by-pass switches 9, 10 or at least one group of fast by-pass switches 7, or connected with both in parallel. It should be noted that the starting circuit 2 is unnecessary, and here the case with the starting circuit 2 is taken as an example for explaining. In addition, at least one side of the series-connection transformer 8 is connected to at least one group of by-pass switches in parallel, and the by-pass switches are by-pass circuit breakers or fast by-pass switches. One side of the series-connection transformer 8 can be connected to the by-pass circuit breakers or fast by-pass switches at the same time, or two sides of the series-connection transformer are connected to the by-pass circuit breakers or fast by-pass switches respectively.

The alternating current sides of the three current converters 4 are connected to the series-connection transformer 8 by the series-connection switching circuit 6 and are then connected to every circuit line. The alternating current sides of the three current converters 4 are connected to an alternating current system after connected to the at least one parallel-connection transformer 1 by the parallel-connection switching circuit 3 the direct current sides of the three converters 4 are connected to the direct current common bus 5 by change-over switches.

The foregoing UPFC can contain at least one parallel-connection side starting circuit 2, the three converters 4 are connected to at least one parallel-connection transformer 1 after connected to the parallel-connection side switching circuit 3 and at least one parallel-connection side starting circuit 2.

Figure 4:
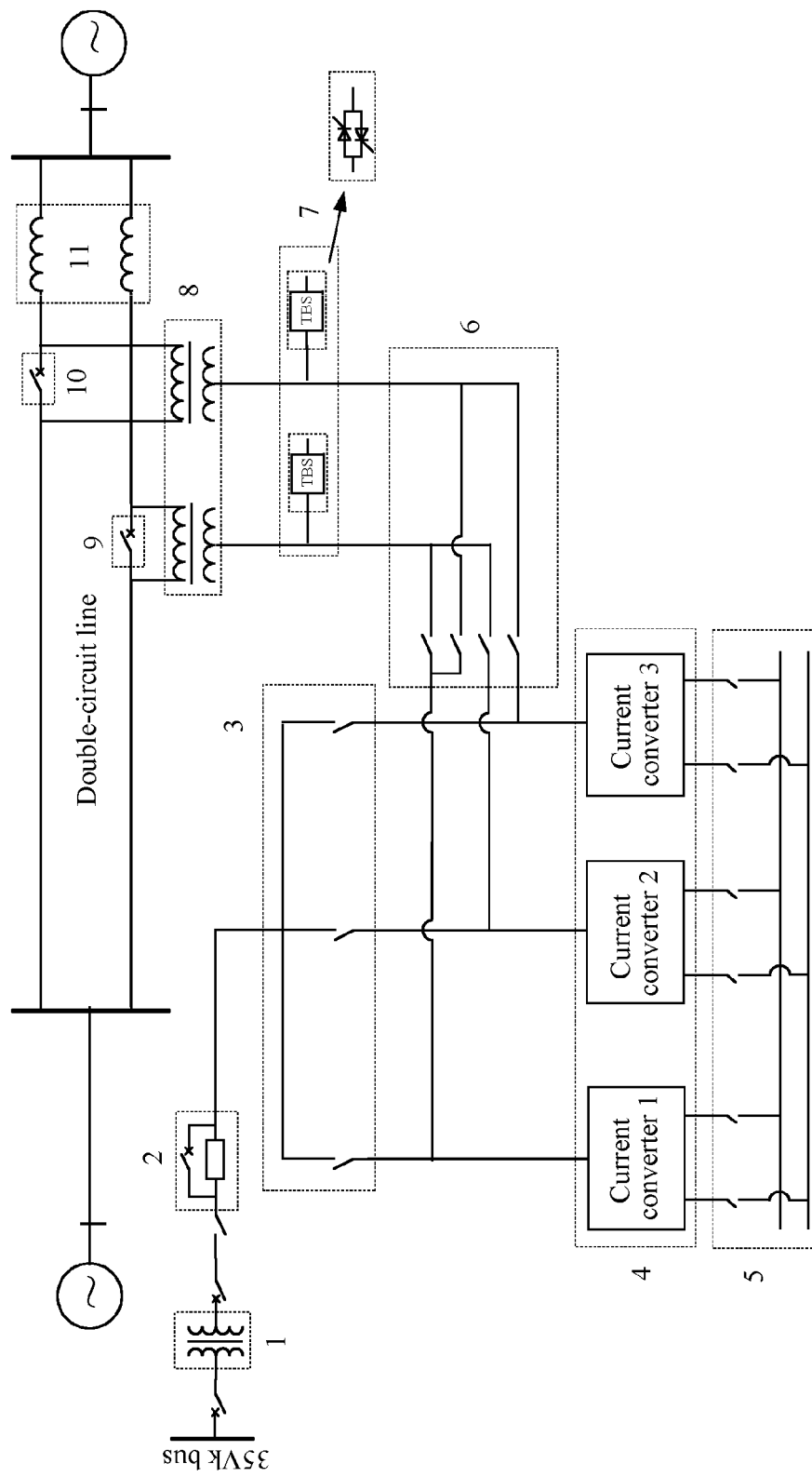
FIG. 4 is a structural diagram of a parallel-connection side switching circuit and a series-connection side switching circuit consisting of change-over switches of one embodiment.

The parallel-connection side switching circuit 3 of the foregoing UPFC can be realized by the change-over switches, thereby connecting or disconnecting the three converters 4 to or from the series-connection starting circuit 2 in different combination modes. The series-connection side switching circuit 6 of the UPFC can be realized by using change-over switches, thereby connecting or disconnecting the three converters 4 to or from the series-connection transformer 8 in different combination modes. For the embodiment as shown in FIG. 4, the three converters can be connected to a parallel-connection side alternating current system by the switching operation of the three change-over switches contained in the parallel-connection side switching circuit. By the switching operation of the four change-over switches contained in the series-connection side switching circuit, the converter 1 can be connected to any circuit line and the converter 2 and converter 3 can be connected to one of the circuit lines.

The at least one group of series-connection transformer by-pass circuit breakers 9 and 10 of the foregoing UPFC is connected to two ends at a line side winding of the series-connection transformer line in parallel and is configured to control the series-connection transformer to connect to or disconnect from the line.

The at least one group of fast by-pass switches 7 of the foregoing UPFC is connected between phases of a valve side of the series-connection transformer in parallel and is configured to fast bypass and isolate the converters from the line.

The foregoing UPFC realizes various operation modes, including but limited to: a double-circuit line UPFC operation mode, a mono-circuit line UPFC operation mode, a static synchronous compensator UPFC operation mode, a static synchronous series-connection compensation UPFC operation mode and an inter-line UPFC operation mode by the switching operation of the parallel-connection side switching circuit 3 and the series-connection side switching circuit 6.

The change-over switches of the parallel-connection side switching circuit 3 and the series-connection side switching circuit 6 of the foregoing UPFC can be isolated switches, or circuit breakers, or switches consisting of power electronic devices.

Figure 3:
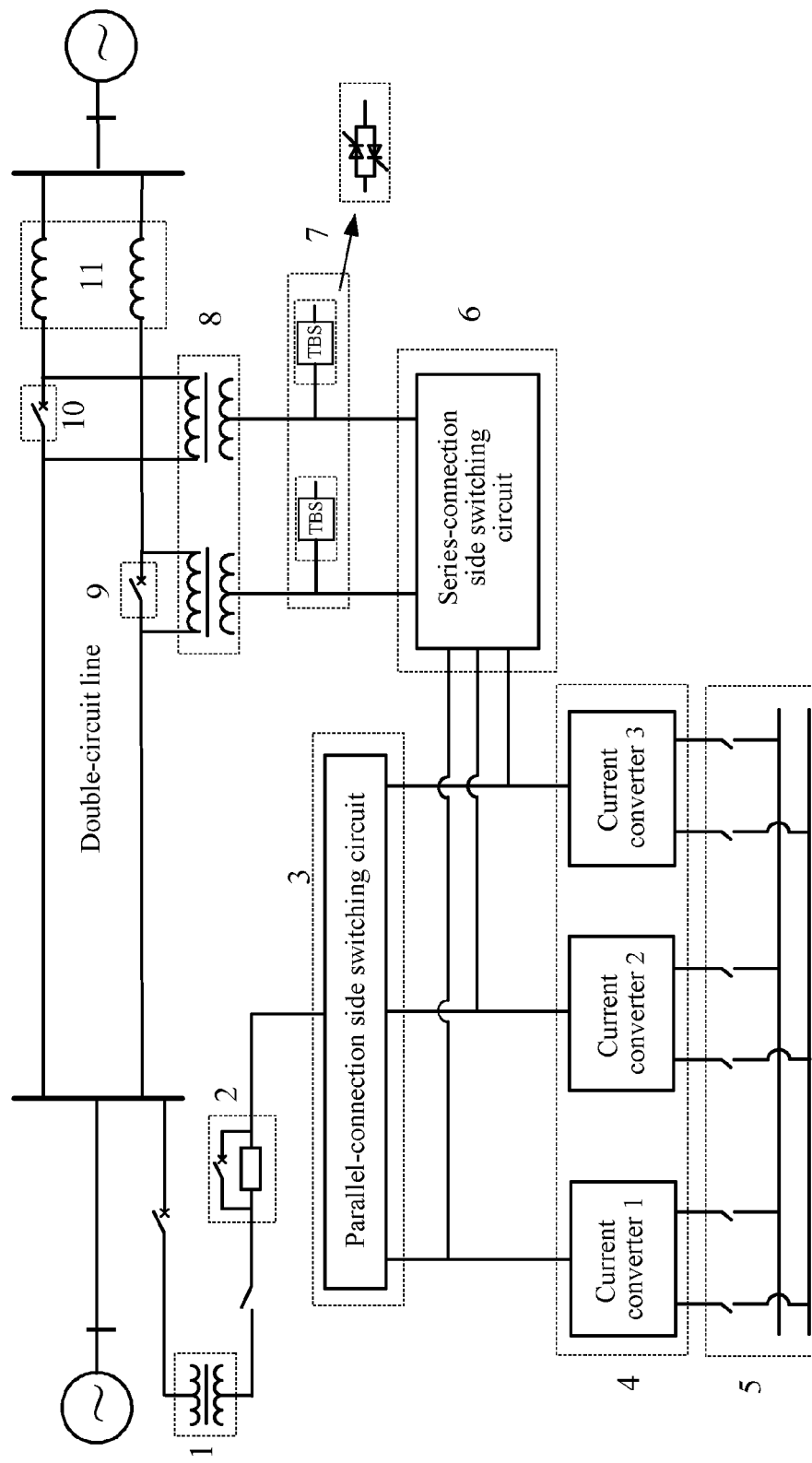
FIG. 3 is a structural diagram that an alternating current system to which a parallel-connection transformer of one embodiment is a double-circuit line common bus.

The alternating current system to which the parallel-connection transformer 1 of the foregoing UPFC is connected can be a common bus of the double-circuit power transmission line, for example the embodiment as shown in FIG. 3, or other alternating current buses, for example the embodiment as shown in FIG. 1.

The parallel-connection side starting circuit 2 of the foregoing UPFC can comprise a pair of resistor and switch connected in parallel, the switch is an isolated switch, circuit breaker, or switch consisting of a power electronic device.

The fast by-pass switches 7 of the foregoing UPFC are circuit breakers, two-way antiparallel thyristors or other power electronic devices.

Figure 2:
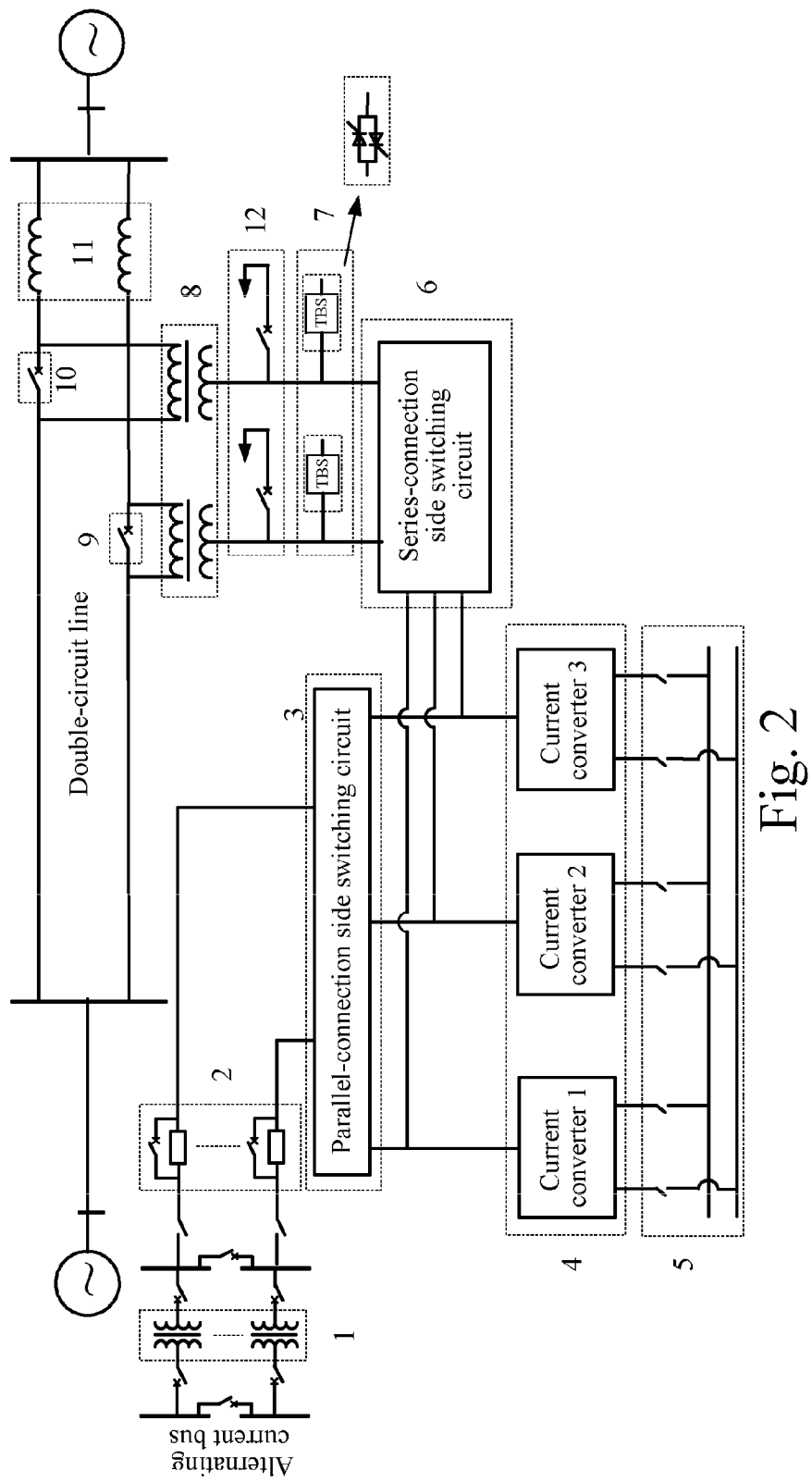
FIG. 2 is a mono-phase equivalent structural diagram of a UPFC of another embodiment of the present invention.

The present invention also provides another embodiment as shown in FIG. 2, which is a structural diagram in which a plurality of parallel-connection transformers, a plurality of parallel-connection starting circuits, and a parallel-connection by-pass circuit breakers at the valve side winding of the series-connection transformer; and 12 is a parallel-connection by-pass circuit breaker at the valve side winding of the series-connection transformer.

The converters 4 of the foregoing UPFC are voltage source type converters, including but not limited to a two-level structure, a transformer multi-structure, modular multi-level structure or other topological structures.

The series-connection transformer 8 of the foregoing UPFC is a mono-phase or tri-phase transformer, and the line side winding of the series-connection transformer 8 is serially connected to the line phase by phase.

When the foregoing UPFC controls an N-circuit line, the number of the converters 4 is at least N+1, the number of the series-connection transformers 8 is at least N and N is a natural number larger than 2.

The present invention introduces the embodiments of the UPFC applied to the double-circuit power transmission line, but the present invention is not limited to the system of the UPFC applied to the double-circuit line, and can be applied to the condition of the UPFC applied to other multi-circuit lines, for example, the invention is applied to the UPFC for multiple lines with different locations in the same power station, etc. Any UPFC involving control over the power flows of double lines by means of the switching operation of three converters belongs to the scope of the present invention.

It should be noted that respective elements such as the reactor, resistor, switch, etc., in the present invention are equivalent elements. That is to say, the equivalent elements in the circuit structure can be formed by single elements or cascading (series connection or parallel connection) multiple same elements. For any equivalent element in the embodiments of the present invention, any equivalent circuit capable of realizing the same function should be covered in the protection scope of the embodiments of the present invention.

Finally, it should be stated that the above embodiments are combined to merely explain the technical solution of the present invention rather than limiting it. Those skilled in the art should understand that they can make modifications or equivalent replacements on the specific embodiments of the present invention, but these modifications or equivalent replacements should be within the protection scope of claims to be approved.

The invention claimed is:

1. A unified power flow controller (UPFC) suitable for a double-circuit transmission line, comprising:
the UPFC applied to the double-circuit transmission line comprises at least one parallel-connection transformer, three current converters, at least two series-connection transformers, a parallel-connection side switching circuit, a series-connection side switching circuit and a direct current common bus; at least one side of the series-connection transformers is connected with at least one group of by-pass switches in parallel; alternating current sides of the three current converters are connected to each loop line in series after being connected with at least one series-connection transformer through the series-connection side switching circuit; the alternating current sides of the three current converters are connected to an alternating current system after connected with the at least one parallel-connection transformer through a parallel-connection side switching circuit; and direct current sides of the three current converters are connected to the direct current common bus through a transfer switch.

2. The UPFC suitable for the double-circuit transmission line according to claim 1, wherein the parallel-connection side switching circuit consists of at least one change-over switch, and is configured to connect or disconnect the three converters to or from a parallel-side of the alternating current system in different combination forms; and the series-connection side switching circuit consists of at least one change-over switch, and is configured to connect or disconnect the three converters to or from the series-connection transformers in different combination forms.

3. The UPFC suitable for the double-circuit transmission line according to claim 2, wherein the change-over switches are isolated switches, or circuit breakers, or switches consisting of power electronic devices.

4. The UPFC suitable for the double-circuit transmission line according to claim 1, wherein the UPFC also comprises at least one parallel-connection side starting circuit, correspondingly, the at least three converters are connected to the at least one parallel-connection side starting circuit by the parallel-connection side switching circuit and are then connected to at least one parallel-connection transformer.

5. The UPFC suitable for the double-circuit transmission line according to claim 3, wherein the parallel-connection side starting circuit comprises a pair of resistor and switch connected in parallel, the switch is an isolated switch, circuit breaker, or switch consisting of a power electronic device.

6. The UPFC suitable for the double-circuit transmission line according to claim 1, wherein the by-pass switches are by-pass circuit breakers or fast by-pass switches.

7. The UPFC suitable for the double-circuit transmission line according to claim 6, wherein the at least one group of by-pass circuit breakers is connected to two ends at a line side winding of the series-connection transformer line in parallel and is configured to control the series-connection transformer to connect to or disconnect from the line.

8. The UPFC suitable for the double-circuit transmission line according to claim 6, wherein the at least one group of fast by-pass switches is connected between phases of a valve side of the series-connection transformer in parallel and is configured to fast bypass and isolate the converters from the line.

9. The UPFC suitable for the double-circuit transmission line according to claim 6, wherein the fast by-pass switches are circuit breakers, two-way antiparallel thyristors or other power electronic devices.

10. The UPFC suitable for the double-circuit transmission line according to claim 1, wherein the UPFC realizes various operation modes, including but limited to: a double-circuit line UPFC operation mode, a mono-circuit line UPFC operation mode, a static synchronous compensator UPFC operation mode, a static synchronous series-connection compensation UPFC operation mode and an inter-line UPFC operation mode by the switching operation of the parallel-connection side switching circuit and the series-connection side switching circuit.

11. The UPFC suitable for the double-circuit transmission line according to claim 1, wherein the change-over switches are isolated switches, or circuit breakers, or switches consisting of power electronic devices.

12. The UPFC suitable for the double-circuit transmission line according to claim 1, wherein the alternating current system to which the parallel-connection transformer is connected is a common bus of the double-circuit power transmission line, or other alternating current buses.

13. The UPFC suitable for the double-circuit transmission line according to claim 1, wherein the converters are voltage source type converters, including but not limited to a two-level structure, a transformer multi-structure or modular multi-level structure.

14. The UPFC suitable for the double-circuit transmission line according to claim 1, wherein the series-connection transformer is a mono-phase or tri-phase transformer, and the line side winding of the series-connection transformer is serially connected to the line phase by phase.

15. The UPFC suitable for the double-circuit transmission line according to claim 1, wherein when the UPFC controls an N-circuit line, the number of the converters is at least N+1, the number of the series-connection transformers is at least N and N is a natural number larger than 2.

\* \* \* \* \*